(12) United States Patent
Li et al.

(10) Patent No.: US 10,355,432 B2
(45) Date of Patent: *Jul. 16, 2019

(54) MOBILE TERMINAL

(71) Applicant: GUANGDONG OPPO MOBILE TELECOMMUNICATIONS CORP., LTD., Dongguan, Guangdong (CN)

(72) Inventors: Feifei Li, Guangdong (CN); Hanjie Huang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,515

(22) Filed: Nov. 5, 2018

(65) Prior Publication Data

US 2019/0074645 A1    Mar. 7, 2019

Related U.S. Application Data

(63) Continuation of application No. 15/647,018, filed on Jul. 11, 2017, now Pat. No. 10,158,202.

(30) Foreign Application Priority Data

Oct. 13, 2016  (CN) .......................... 2016 1 0893613
Oct. 13, 2016  (CN) ...................... 2016 2 1119904 U

(51) Int. Cl.
  H01R 13/504    (2006.01)
  H01R 24/58    (2011.01)
  (Continued)

(52) U.S. Cl.
  CPC .............. H01R 24/58 (2013.01); H01R 13/40 (2013.01); H01R 13/405 (2013.01);
  (Continued)

(58) Field of Classification Search
  CPC .... H01R 24/58; H01R 24/04; H01R 13/5205; H01R 24/62; H01R 24/60
  See application file for complete search history.

(56) References Cited

U.S. PATENT DOCUMENTS 9,729,686 B2 *   8/2017   Chung ................ H04M 1/0277
2004/0242076 A1 * 12/2004  Nakai .................... H01R 24/40
                                                       439/668

(Continued)

FOREIGN PATENT DOCUMENTS

CN        1518787 A      8/2004
CN      104103937 A     10/2014

OTHER PUBLICATIONS

European Patent Application No. 17178464.8 Office Action dated Nov. 28, 2018, 5 pages.

(Continued)

*Primary Examiner* — Abdullah A Riyami
*Assistant Examiner* — Nader J Alhawamdeh
(74) *Attorney, Agent, or Firm* — Lathrop Gage LLP

(57) ABSTRACT

The present disclosure provides a mobile terminal. The mobile terminal includes a display screen and an earphone socket, the display screen being spaced apart from the earphone socket. The earphone socket includes: a housing defining a mounting cavity; a support bracket in the mounting cavity; and a plurality of pins are located between the support bracket and inner walls of the mounting cavity, and the plurality of pins passes through a back wall of the mounting cavity to expose outer ends of the plurality of pins. The support bracket is provided with a supporting passage, and at least one pin is snapped into the supporting passage.

20 Claims, 5 Drawing Sheets

(51) Int. Cl.
*H04R 1/10* (2006.01)
*H01R 13/40* (2006.01)
*H04B 1/3827* (2015.01)
*H01R 43/20* (2006.01)
*H01R 13/66* (2006.01)
*H01R 13/405* (2006.01)
*H01R 107/00* (2006.01)

(52) U.S. Cl.
CPC ........... *H01R 13/665* (2013.01); *H01R 43/20* (2013.01); *H04B 1/3827* (2013.01); *H04R 1/1091* (2013.01); *H01R 2107/00* (2013.01)

(56) References Cited

U.S. PATENT DOCUMENTS

| | | | | |
|---|---|---|---|---|
| 2009/0011628 | A1* | 1/2009 | Purchon | H01R 13/7031 439/188 |
| 2009/0061694 | A1* | 3/2009 | Kawasaki | H01R 13/5219 439/669 |
| 2014/0273617 | A1* | 9/2014 | Cheong | H01R 13/5213 439/521 |
| 2015/0173245 | A1* | 6/2015 | Chung | H04M 1/0277 361/714 |
| 2015/0230348 | A1* | 8/2015 | Yoon | H01R 24/58 361/796 |
| 2015/0288114 | A1 | 10/2015 | Tong et al. | |
| 2016/0336678 | A1* | 11/2016 | Choi | H01R 13/5202 |

OTHER PUBLICATIONS

Chinese Patent Application No. 201610893613.1 Office Action dated Jan. 11, 2019, 5 pages.
Chinese Patent Application No. 201610893613.1 English translation of Office Action dated Jan. 11, 2019, 4 pages.

* cited by examiner

MOBILE TERMINAL

CROSS-REFERENCE TO RELATED APPLICATIONS

This application is a continuation of U.S. patent application Ser. No. 15/647,018, filed Jul. 11, 2017 and which claims priority to and benefits of Chinese Patent Application No. 201610893613.1, filed with State Intellectual Property Office on Oct. 13, 2016, and Chinese Patent Application No. 201621119904.7, filed with State Intellectual Property Office on Oct. 13, 2016, the entire contents of which are incorporated herein by reference.

FIELD

The present disclosure relates to a technical field of mobile terminals.

BACKGROUND

In the related art, an earphone socket is used as a main adapter for electrical signal transmission in all types of electronic products, specially provided as an audio connector for audio signal output/input and more widely applied in various kinds of audiovisual products. In particular, with the rapid development of a variety of portable electronic products, such as mobile phones, personal digital assistants (PAD), MP3 players, recording pens, and notebook computers, earphones with various sizes have been extensively used in those products in recent years.

SUMMARY

The present disclosure provides a mobile terminal. The mobile terminal includes a display screen and an earphone socket, the display screen being spaced apart from the earphone socket, and the earphone socket including: a housing, defining a mounting cavity; a support bracket in the mounting cavity; and a plurality of pins, located between the support bracket and inner walls of the mounting cavity, wherein the plurality of pins passes through a back wall of the mounting cavity to expose outer ends of the plurality of pins. The support bracket is provided with a supporting passage, and at least one pin is snapped into the supporting passage.

The present disclosure provides another mobile terminal. The mobile terminal includes a display screen and an earphone socket, the display screen being spaced apart from the earphone socket, and the earphone socket including: a housing, defining a mounting cavity; a support bracket located in the mounting cavity and provided with a first supporting passage, and at least one first pin being snapped into the first supporting passage; and a plurality of pins, located between the support bracket and inner walls of the mounting cavity, the plurality of pins passes through a back wall of the mounting cavity to expose outer ends of the plurality of pins, one of the first supporting passage and the at least one first pin is provided with a first limiting protrusion, and the other of the first supporting passage and the at least one first pin is provided with a first limiting groove fitted with the first limiting protrusion.

The present disclosure provides yet another mobile terminal. The mobile terminal includes a display screen and an earphone socket, the display screen being spaced apart from the earphone socket, and the earphone socket including: a housing, defining a mounting cavity; a support bracket located in the mounting cavity and comprising a rear-end baffle, the rear-end baffle having two end portions provided with the cutting recesses, and the cutting recesses being configured to be filled with glue; and a plurality of pins, located between the support bracket and inner walls of the mounting cavity, the plurality of pins passes through a back wall of the mounting cavity to expose outer ends of the plurality of pins.

DETAILED DESCRIPTION

Figure 1:
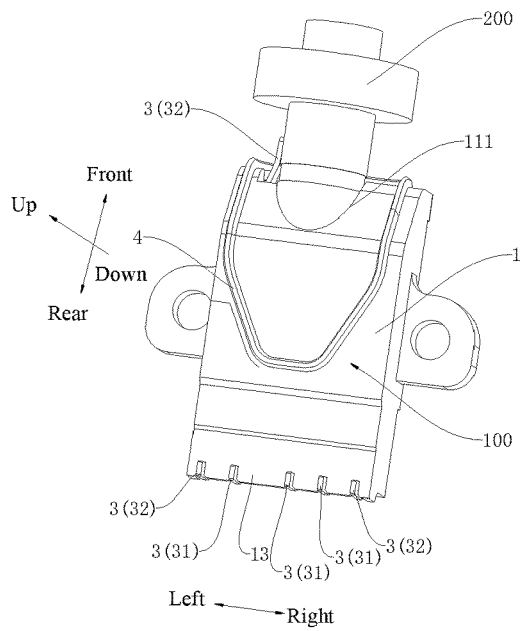
FIG. 1 is a perspective view of an earphone socket according to an embodiment of the present disclosure.

Reference will be made in detail to embodiments of the present disclosure. Examples of the embodiments are illustrated in the drawings. The embodiments described herein with reference to drawings are explanatory, and used to interpret the present disclosure. The embodiments shall not be construed to limit the present disclosure.

In the specification, it is to be understood that terms such as "central," "length," "width," "thickness," "upper," "lower," "front," "rear," "left," "right," "inner," "outer," "axial" and "circumferential" should be construed to refer to the orientations or positions as described or as illustrated in the drawings under discussion. These relative terms are for convenience of description and do not indicate or imply that the device or element referred to must have a particular orientation or be constructed or operated in a particular orientation. Thus, the relative terms shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" can comprise one or more of this feature. In the description of the present disclosure, "a plurality of" means two or more than two, unless specified otherwise.

In the present disclosure, unless specified or limited otherwise, the terms "mounted", "connected", "coupled", "fixed" and the like are used broadly, and can be, for example, fixed connections, detachable connections, or integral connections; can also be mechanical or electrical connections; can also be direct connections or indirect connections via intervening structures; can also be inner communications of two elements, which can be understood by those skilled in the art according to specific situations.

The present disclosure provides a mobile terminal. The mobile terminal includes a display screen and an earphone socket, the display screen being spaced apart from the earphone socket, and the earphone socket including: a housing, defining a mounting cavity; a support bracket in the mounting cavity; and a plurality of pins, located between the support bracket and inner walls of the mounting cavity, wherein the plurality of pins passes through a back wall of the mounting cavity to expose outer ends of the plurality of pins. The support bracket is provided with a supporting passage, and at least one pin is snapped into the supporting passage.

The present disclosure provides another mobile terminal. The mobile terminal includes a display screen and an earphone socket, the display screen being spaced apart from the earphone socket, and the earphone socket including: a housing, defining a mounting cavity; a support bracket located in the mounting cavity and provided with a first supporting passage, and at least one first pin being snapped into the first supporting passage; and a plurality of pins, located between the support bracket and inner walls of the mounting cavity, the plurality of pins passes through a back wall of the mounting cavity to expose outer ends of the plurality of pins, one of the first supporting passage and the at least one first pin is provided with a first limiting protrusion, and the other of the first supporting passage and the at least one first pin is provided with a first limiting groove fitted with the first limiting protrusion.

The present disclosure provides yet another mobile terminal. The mobile terminal includes a display screen and an earphone socket, the display screen being spaced apart from the earphone socket, and the earphone socket including: a housing, defining a mounting cavity; a support bracket located in the mounting cavity and comprising a rear-end baffle, the rear-end baffle having two end portions provided with the cutting recesses, and the cutting recesses being configured to be filled with glue; and a plurality of pins, located between the support bracket and inner walls of the mounting cavity, the plurality of pins passes through a back wall of the mounting cavity to expose outer ends of the plurality of pins.

In the following, an earphone socket 100 according to embodiments of the present disclosure will be described with reference to FIGS. 1 to 11.

FIGS. 1 to 11 illustrate the earphone socket 100 according to embodiments of the present disclosure, and the earphone socket 100 includes a housing 1, a supporting rack 2 and a plurality of pins 3.

Specifically, the housing 1 defines a mounting cavity 12, a rear end of the mounting cavity 12 is open, and a support bracket 2 is fixedly arranged in the mounting cavity 12. The plurality of pins 3 are located between the support bracket 2 and inner walls of the mounting cavity 12, and the plurality of pins 3 passes through a back wall of the mounting cavity 12 to expose outer ends of the plurality of pins 3. The plurality of pins 3 include at least one first pin 31, the at least one first pin 31 is snapped onto the support bracket 2, and respective tail portions of the plurality of pins 3 extend out of the mounting cavity 12 through the rear end of the mounting cavity 12. When assembled, a plurality of first pins 31 can be first snapped onto the support bracket 2, and then the at least one first pin 31 and the support bracket 2 are assembled into the mounting cavity 12 together from the rear end of the mounting cavity 12. Thus, it is unnecessary to assemble the at least one first pin 31 individually, which can simplify a structure and an assembling process of the earphone socket 100, save assembling time and improve production efficiency. Furthermore, the support bracket 2 can play a role of fixing and supporting the plurality of first pins 31, and hence when the earphone plug 200 is inserted into an insertion hole 11 in the mounting cavity 12, reliability of connection between the first pin 31 and the earphone plug 200 can be enhanced.

For the earphone socket 100 according to embodiments of the present disclosure, by providing the support bracket 2 in the mounting cavity 12, and snapping the plurality of first pins 31 onto the support bracket 2, it is possible to simplify the structure and the assembling process of the earphone socket 100, save the assembling time and improve the production efficiency. Meanwhile, the support bracket 2 can play the role of fixing and supporting the plurality of first pins 31, and hence when the earphone plug 200 is inserted into the insertion hole 11 in the mounting cavity 12, the reliability of connection between the first pin 31 and the earphone plug 200 can be enhanced.

Figure 4:
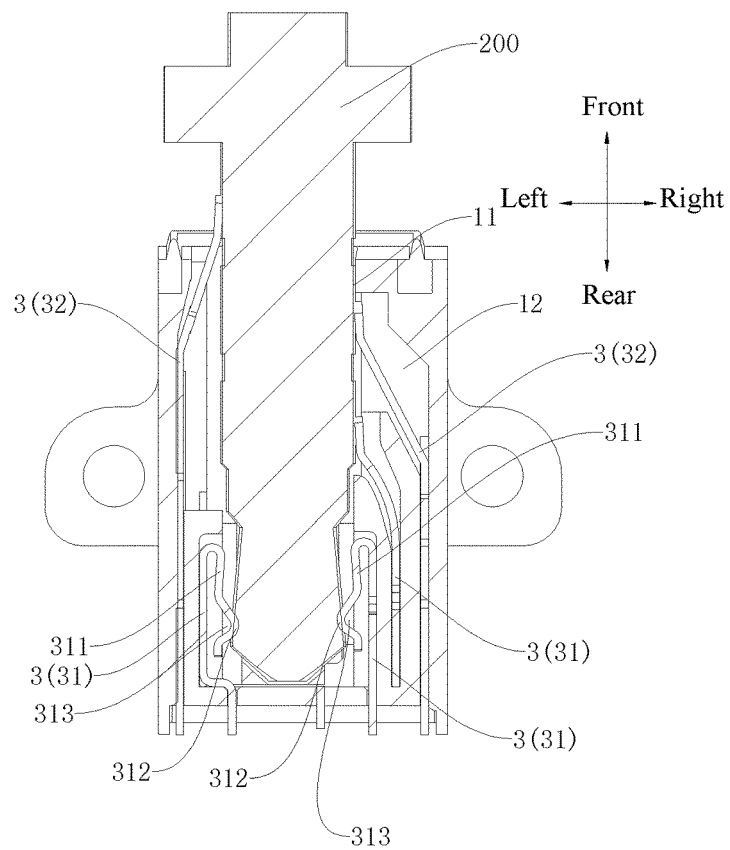
FIG. 4 is a sectional view of an earphone socket according to an embodiment of the present disclosure.
Figure 8:
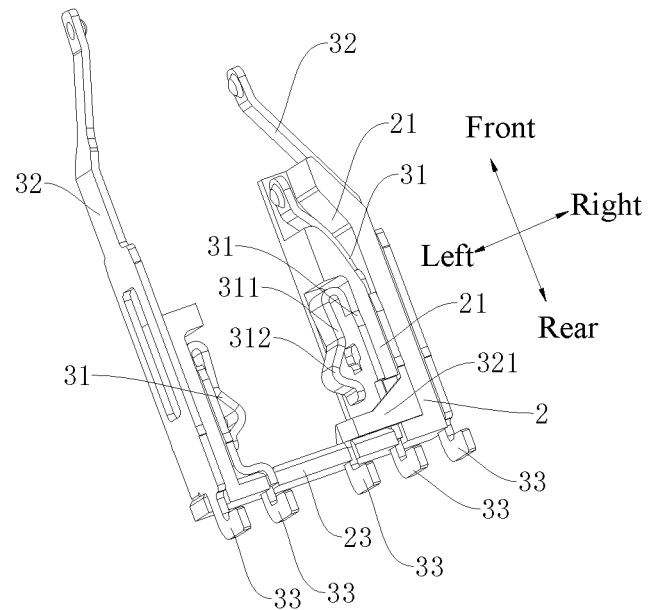
FIG. 8 is a schematic view of a support bracket and a pin of an earphone socket according to an embodiment of the present disclosure.
Figure 10:
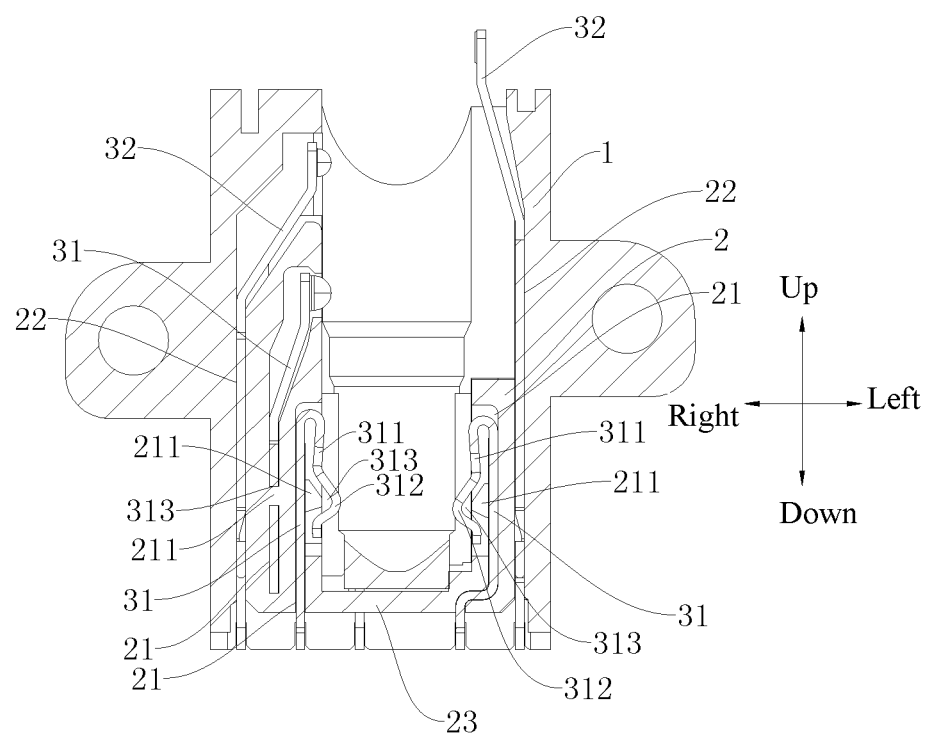
FIG. 10 is a sectional view of an earphone socket according to an embodiment of the present disclosure.
Figure 11:
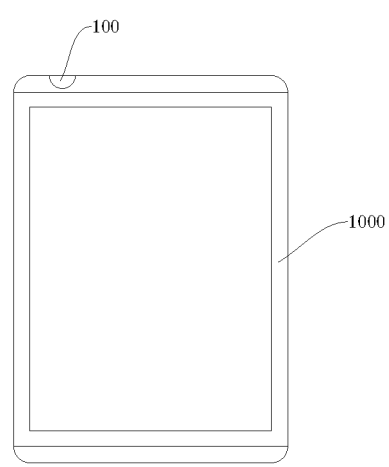
FIG. 11 is a schematic view of a mobile terminal according to an embodiment of the present disclosure.

In some embodiments of the present disclosure, as illustrated in FIGS. 4, 8 and 10, the support bracket 2 is provided with a first supporting passage 21, and the at least first pin 31 is snapped into the first supporting passage 21. The first supporting passage 21 can act as fixation and support for the at least one first pin 31, thereby enhancing the reliability of connection between the first pin 31 and the earphone plug 200.

As illustrated in FIG. 8, the earphone socket 100 has five pins 3, including three first pins 31. The three first pins 31 are located in the middle of the five pins 3, one first pin 31 is located at a left side of the insertion hole 11, and two first pins 31 are located at a right side of the insertion hole 11. The first pin 31 at the left side of the insertion hole 11 has a same shape as the first pin 31 at the right side of the insertion hole 11 and adjacent to the insertion hole 11, and these two first pins 31 each are provided with a flexed portion 311 flexed rearwards at a head portion. The flexed portion 311 is provided with a protruding portion 312 protruding towards an interior of the insertion hole 11, and the protruding portion 312 can be in contact with the earphone plug 200 to realize connection with the earphone plug 200. The first pin 31 at the right side of the insertion hole 11 and away from the insertion hole 11 is provided with a bent portion 321 bent leftwards at the tail portion. A free end of the bent portion 321 is bent rearwards again to form a connecting segment 33, and the connecting segment 33 extends out of the mounting cavity 12 through the rear end of the mounting cavity 12.

Further, one of the first supporting passage 21 and the first pin 31 is provided with a first limiting protrusion 211, and the other of the first supporting passage 21 and the first pin 31 is provided with a first limiting groove 313 fitted with the first limiting protrusion 211. Thus, the first pin 31 can be further fixed in the first supporting passage 21 to prevent the first pin 31 from moving in the first supporting passage 21, so as to further guarantee the reliability of connection between the first pin 31 and the earphone plug 200.

As illustrated in FIG. 10, a first limiting groove 313 is defined in a side, away from the insertion hole 11, of the protruding portion 312 of each of the first pin 31 at the left side of the insertion hole 11 and the first pin 31 at the right side of the insertion hole 11 and adjacent to the insertion hole 11, so as to accommodate a first limiting protrusion 211 fitted with the first limiting groove 313 and provided in a first supporting passage for each of the two first pins 31. In such a case, a cross section of the first limiting groove 313 and a cross section of the first limiting protrusion 211 are substantially shaped to be triangular. A first limiting groove 313 is defined in the first pin 31 at the right side of the insertion hole 11 and away from the insertion hole 11, and the first limiting groove 313 is configured as a notch in the first pin 31 to accommodate a first limiting protrusion 211 fitted with the first limiting groove 313 and provided in a first supporting passage for this first pins 31. In such a case, a cross section of the first limiting groove 313 and a cross section of the first limiting protrusion 211 are substantially shaped to be rectangular.

In some embodiments, as illustrated in FIG. 10, the support bracket 2 and an inner sidewall of the mounting cavity 12 define a second supporting passage 22, the plurality of pins 3 include at least one second pin 32, and the at least one second pin 32 is snapped into the second supporting passage 22. The second supporting passage 22 can fix and support the at least one second pin 32, so as to enhance reliability of connection between the at least one second pin 32 and the earphone plug 200. In addition, since the second supporting passage 22 is defined by the support bracket 2 and the inner sidewall of the mounting cavity 12, it is possible to avoid providing the second supporting passage 22 in the support bracket 2, which simplifies the structure of the support bracket 2, and reduces a width of the support bracket 2 in a left-right direction, thereby decreasing a width of the earphone socket 100 in the left and right direction and reducing a volume of the earphone socket 100.

Further, one of the second supporting passage 22 and the second pin 32 is provided with a second limiting protrusion 221, and the other thereof is provided with a second limiting groove 322 fitted with the second limiting protrusion 221. Thus, the at least one second pin 32 can be further fixed in the second supporting passage 22 to prevent the second pin 32 from moving in the second supporting passage 22, so as to further guarantee the reliability of connection between the at least one second pin 32 and the earphone plug 200.

Figure 9:
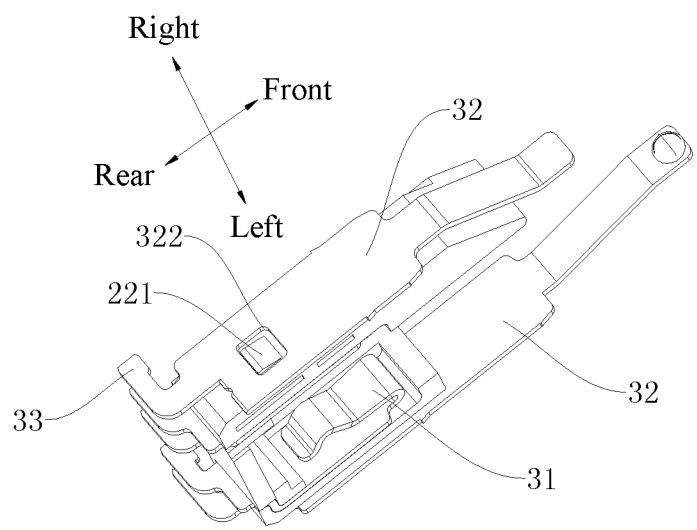
FIG. 9 is a schematic view of a support bracket and a pin of an earphone socket according to an embodiment of the present disclosure.

As illustrated in FIGS. 4, 9 and 10, a left sidewall and a right sidewall of the support bracket 2 and the inner sidewall of the mounting cavity 12 define two second supporting passages 22. The plurality of pins 3 include two second pins 32, and the two second pins 32 are located in the two second supporting passages 22 respectively. Each of two sidewalls of the support bracket 2 is provided with one second limiting protrusion 221, and each of the two second pins 32 is provided with one second limiting groove 322, the second limiting groove 322 being fitted with the second limiting protrusion 221. In a direction towards an exterior of the insertion hole 11, a front end face of the second limiting protrusion 221 is inclined rearwards, such that the second limiting groove 322 can be fitted with the second limiting protrusion 221 conveniently. When assembled, the second pin 32 can be first snapped onto the support bracket 2, and then the second pins 32 and the support bracket 2 are assembled into the mounting cavity 12 together.

In some embodiments of the present disclosure, as illustrated in FIGS. 1, 2, 3, 5 and 7, the housing 1 includes a fixed baffle 13. The fixed baffle 13 is located at a rear end of the housing 1 and provided with clearance notches 131. The tail portions of the pins 3 pass through the clearance notches 131. In order to prevent the pin 3 from loosening during insertion and removal of the earphone plug 200, a rear end face of the housing 1 is filled with a waterproof glue to fix the pins 3. Meanwhile, the waterproof glue can play a waterproof and dustproof role, so as to prevent liquid (e.g. water) in the insertion hole 11 from flowing to a circuit board along the pin 3 through the insertion hole 11, thereby guaranteeing operational reliability of the circuit board.

The fixed baffle 13 protrudes beyond the rear end face of the housing 1, and thus can prevent the waterproof glue from flowing to the circuit board, thereby further guaranteeing the operational reliability of the circuit board. In addition, since the fixed baffle 13 protrudes beyond the rear end face of the housing 1, when connecting segments 33 of the pins 3 are connected with the circuit board, the connecting segments 33 need to bypass a rear end face of the fixed baffle 13 to be connected with the circuit board. When the fixed baffle 13 is provided with the clearance notches 131, the connecting segments 33 pass through the clearance notches 131 to be connected with the circuit board, which can reduce a length of the pins 3 along a front-rear direction (e.g. a front-rear direction illustrated in FIG. 1), so as to further decrease the volume of the earphone socket 100. Meanwhile, the clearance notches 131 can position the pins 3.

Figure 2:
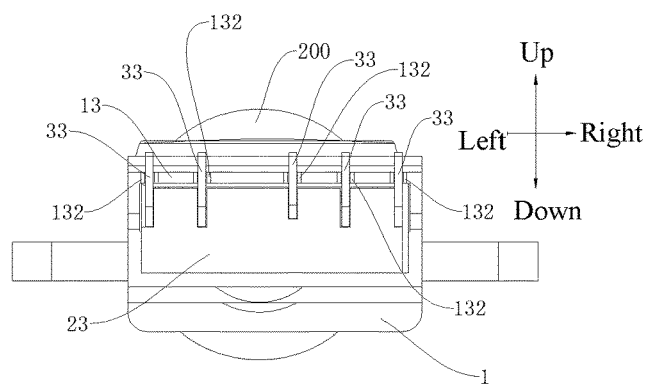
FIG. 2 is a rear view of an earphone socket according to an embodiment of the present disclosure.
Figure 3:
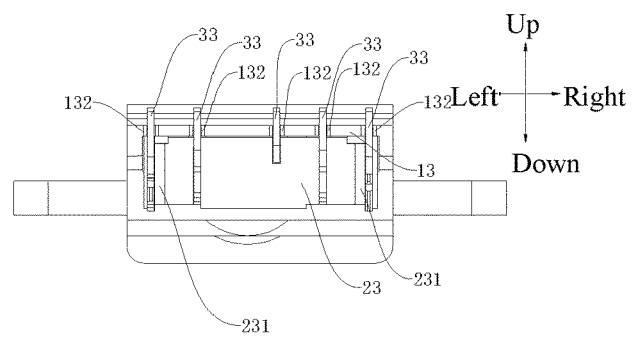
FIG. 3 is a rear view of an earphone socket according to an embodiment of the present disclosure.
Figure 5:
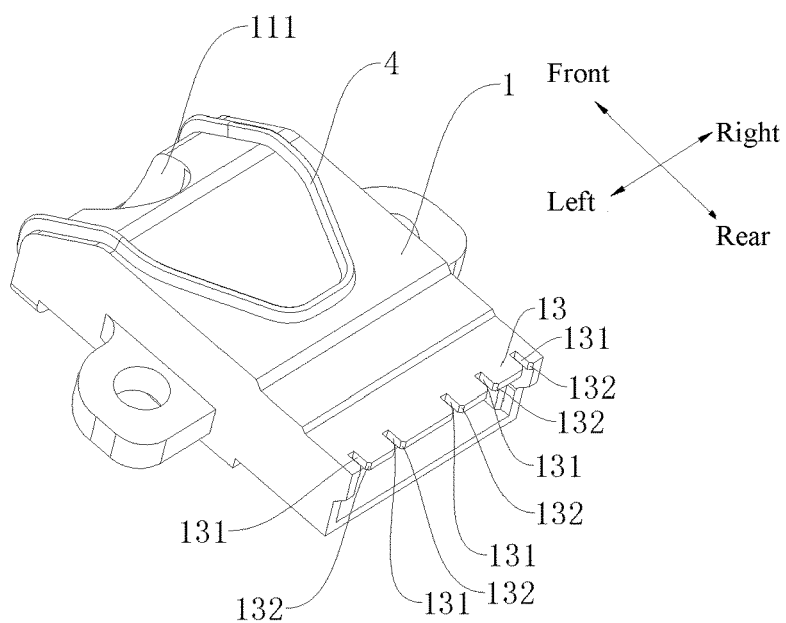
FIG. 5 is a perspective view of a housing of an earphone socket according to an embodiment of the present disclosure.

Further, as illustrated in FIGS. 2, 3 and 5, an open end of each clearance notch 131 is provided with a guide bevel 132. For instance, in examples illustrated in FIGS. 2, 3 and 5, two sidewalls of the clearance notch 131 each are provided with the guide bevel 132, and the guide bevel 132 is inclined towards a direction away from an interior of the clearance notch 131 in the front-rear direction. Thus, when the pins 3 are mounted in the mounting cavity 12 from the rear end of the housing 1, guide bevels 132 can guide the pins 3 to make the connecting segments 33 snapped into the clearance notches 131 smoothly.

In some embodiments of the present disclosure, as illustrated in FIGS. 2, 3, 4 and 10, the support bracket 2 includes a rear-end baffle 23, and the plurality of pins 3 can extend out of the mounting cavity 12 after passing through the rear-end baffle 23. The rear-end baffle 23 can prevent the support bracket 2 from coming out rearwards. Meanwhile, the glue can be filled in an accommodating chamber defined by a rear end face of the rear-end baffle 23 and an inner sidewall of the housing 1 together, so as to fix the pins 3 and play the waterproof and dustproof role at the same time. An end portion of at least one end of the rear-end baffle 23 is provided with a cutting recess 231. As illustrated in FIG. 3, end portions of left and right ends of the rear-end baffle 23 are correspondingly provided with the cutting recesses 231 extending along an up-down direction. The glue can be filled in the cutting recess 231 to reinforce the fixing of the pins 3 and the waterproof and dustproof function under the action of the glue.

In some embodiments of the present disclosure, the earphone socket 100 further includes a shielding cover body. The shielding cover body shields the rear end of the mounting cavity 12. An adhesive layer is provided between the support bracket 2 and the shielding cover body, and provided between the housing 1 and the shielding cover body. The shielding cover body can further reinforce a waterproof and dustproof effect of the earphone socket 100 on the one hand, and protect the pins 3 extending out of the mounting cavity 12 from being damaged on the other hand. Meanwhile, the adhesive layer can enhance the waterproof and dustproof effect of the earphone socket 100.

In some embodiments of the present disclosure, as illustrated in FIGS. 1 and 4, the housing 1 is provided with the insertion hole 11 and the mounting cavity 12 therein. The insertion hole 11 has an open port 111 at one end. The mounting cavity 12 is in communication with the insertion hole 11. The earphone plug 200 can be inserted into the insertion hole 11 through the open port 111. The plurality of pins 3 are located in the mounting cavity 12, and the mounting cavity 12 is in communication with the insertion hole 11, such that one end of each of the plurality of pins 3 is connected with the earphone plug 200. The head portion of one of the plurality of pins 3 (e.g. the second pin 32 as illustrated) extends out of the insertion hole 11 through the open port 111. When one of the plurality of pins 3 extends out from of the insertion hole 11 through the open port 111, this pin 3 is in contact connection with the earphone plug 200 outside the insertion hole 11, so as to reduce a length of the housing 1 along the front-rear direction (the front-rear direction illustrated in FIG. 1), decrease the volume of the earphone socket 100, and hence reduce a space occupied by the earphone socket 100 inside a mobile terminal 1000, thereby facilitating miniaturization of the mobile terminal 1000.

In some embodiments of the present disclosure, the earphone socket 100 further includes the circuit board. The tail portions of the plurality of pins 3 extend out from a common sidewall (e.g. an upper wall) of the housing 1 to be taken as the connecting segments 33. The circuit board is provided with a plurality of bonding pads, and the connecting segments 33 are welded to the bonding pads. Therefore, it is convenient to connect the connecting segments 33 of the tail portions of the plurality of pins 3 with the same circuit board. When the tail portions of the plurality of pins 3 extend out from different sides, the structure of the pins 3 will become complex if the tail portions of the plurality of pins 3 need to be welded with the same circuit board. Certainly, the plurality of pins 3 can be welded with different circuit boards, but the structural complexity of the earphone socket 100 will be raised, the volume of the earphone socket 100 will be increased, and it is not conducive to installation of the earphone socket 100. Therefore, by configuring the tail portions of the plurality of pins 3 to extend out from the same sidewall of the housing 1, the tail portions of the plurality of pins 3 can be connected with the same circuit board, which can not only simplify the structure of the plurality of pins 3, but also simplify the structure of the earphone socket 100, thus reducing the volume of the earphone socket 100. Furthermore, the installation of the earphone socket 100 can be facilitated, and the layout of components in the mobile terminal 1000 can be optimized.

In some embodiments of the present disclosure, the circuit board defines a connecting hole. At least one of the plurality of connecting segments 33 extends into the connecting hole, and the bonding pad is arranged at the connecting hole to be welded with the connecting segment 33. Therefore, it is possible to enhance reliability of connection between the connecting segment 33 and the circuit board and prevent the connecting segment 33 from being detached from the bonding pad of the circuit board.

Further, the bonding pad is arranged in the connecting hole. Thus, when the connecting segment 33 extends into the connecting hole, the connecting segment 33 can be connected with the bonding pad conveniently, thereby enhancing the reliability of connection between the connecting segment 33 and the circuit board. Optionally, the bonding pad can be shaped into a ring and fitted over an opening of the connecting hole. Therefore, when the connecting segment 33 extends into the connecting hole, the connecting segment 33 can be connected with the bonding pad conveniently, thereby enhancing the reliability of connection between the connecting segment 33 and the circuit board.

In some embodiments of the present disclosure, at least one of the plurality of connecting segments 33 is attached to the circuit board. The plurality of bonding pads can be provided on a surface of the circuit board, and at least one of the plurality of connecting segments 33 can be attached to the circuit board by being welded with the bonding pad. Therefore, it is possible to enlarge a welding area between the connecting segment 33 and the circuit board, enhance the reliability of connection between the connecting segment 33 and the circuit board, and facilitate the welding between the connecting segment 33 and the circuit board.

Figure 6:
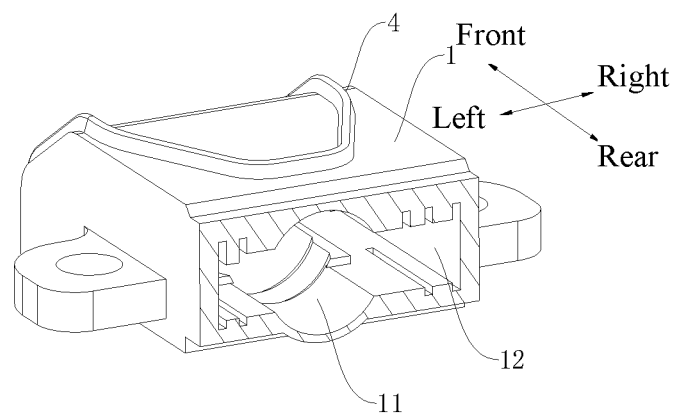
FIG. 6 is a sectional view of a housing of an earphone socket according to an embodiment of the present disclosure.

In some embodiments of the present disclosure, as illustrated in FIGS. 1, 5 and 6, the earphone socket 100 further includes a sealing member 4. The sealing member 4 extends along a periphery of the open port 111 and is embedded in an outer surface of the housing 1. Thus, it is possible to prevent water outside the mobile terminal 1000 from flowing into the mobile terminal 1000 along the outer surface of the housing 1 of the earphone socket 100, and hence avoid damaging the circuit board or the like inside the mobile terminal 1000.

Figure 7:
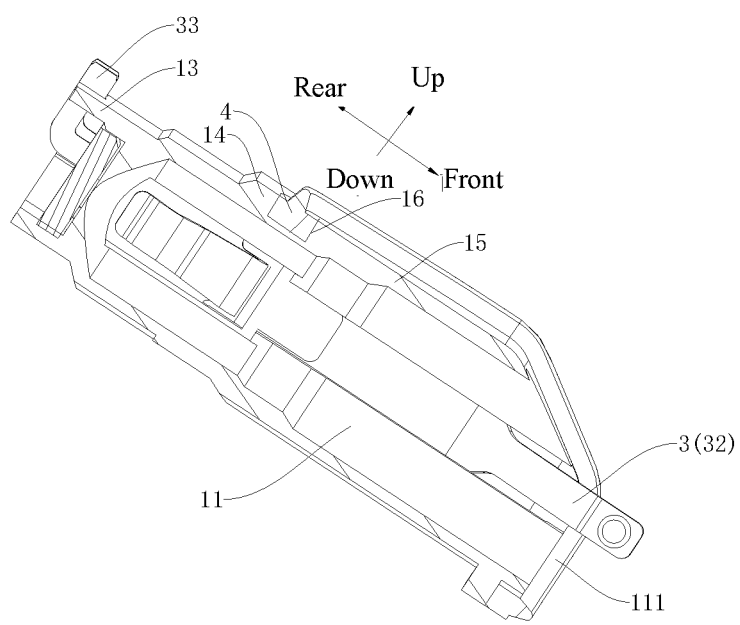
FIG. 7 is a sectional view of an earphone socket according to an embodiment of the present disclosure.

Further, as illustrated in FIG. 7, the housing 1 includes an outer hole-side-wall 15 (an outer portion of a side wall of an insertion hole receiving an earphone plug, the outer portion meaning a portion close to the outside along an axial direction of the insertion hole) and an inner hole-side-wall 14 (an inner portion of a side wall of the insertion hole receiving an earphone plug, the inner portion meaning a portion away from the outside along an axial direction of the insertion hole) arranged along a central axis of the insertion hole 11. A wall thickness of the inner hole-side-wall 14 is greater than a wall thickness of the outer hole-side-wall 15. The inner hole-side-wall 14 and the outer hole-side-wall 15 together define the insertion hole 11 with the open port 111 at one end, and the open port 111 is located in the outer hole-side-wall 15. At least part of the sealing member 4 extends to the inner hole-side-wall 14. Since the sealing member 4 is embedded in the housing 1 through an embedding groove 16, at least part of the embedding groove 16 can be provided in the inner hole-side-wall 14 when at least part of the sealing member 4 extends to the inner hole-side-wall 14. Since the thickness of the inner hole-side-wall 14 is greater than that of the outer hole-side-wall 15, at least part of the embedding groove 16 can be provided in the inner hole-side-wall 14, which can enhance a structural strength of the housing 1, improve operational reliability of the housing 1, and improve waterproof and dustproof reliability of the earphone socket 100.

An earphone socket 100 according to a specific embodiment of the present disclosure will be described with reference to FIGS. 1 to 11. The following description is only illustrative and intended to interpret the present disclosure but shall not be construed to limit the present disclosure.

As illustrated in FIGS. 1 to 11, the earphone socket 100 according to the embodiment of the present disclosure includes the housing 1, the support bracket 2 and five pins 3.

Specifically, the housing 1 defines the mounting cavity 12 and the insertion hole 11. The insertion hole 11 is in communication with the mounting cavity 12, the rear end of the mounting cavity 12 is open, and a front end of the insertion hole 11 is open to define the open port 111. The support bracket 2 is arranged in the mounting cavity 12. The five pins 3 include three first pins 31 and two second pins 32, and the three first pins 31 are located between the two second pins 32. One first pin 31 is located at the left side of the insertion hole 11, and two first pins 31 are located at the right side of the insertion hole 11. The first pin 31 at the left side of the insertion hole 11 has the same shape as the first pin 31 at the right side of the insertion hole 11 and adjacent to the insertion hole 11, and these two first pins 31 each are provided with the flexed portion 311 flexed rearwards at the head portion. The flexed portion 311 is provided with the protruding portion 312 protruding towards the interior of the insertion hole 11, and the protruding portion 312 can be in contact with the earphone plug 200 to realize the connection with the earphone plug 200. The first pin 31 at the right side of the insertion hole 11 and away from the insertion hole 11 is provided with the bent portion 321 bent leftwards at the tail portion. The free end of the bent portion 321 is bent rearwards again to form the connecting segment 33, and the connecting segment 33 extends out of the mounting cavity 12 through the rear end of the mounting cavity 12.

As illustrated in FIGS. 4 and 10, the support bracket 2 is provided with first supporting passages 21, and the first pins 31 are snapped into the first supporting passages 21. The first limiting groove 313 is defined in the side, away from the insertion hole 11, of the protruding portion 312 of each of the first pin 31 at the left side of the insertion hole 11 and the first pin 31 at the right side of the insertion hole 11 and adjacent to the insertion hole 11, so as to accommodate the first limiting protrusion 211 fitted with the first limiting groove 313 and provided in the first supporting passage for each of the two first pins 31. In such a case, the cross section of the first limiting groove 313 and that of the first limiting protrusion 211 are substantially shaped to be triangular. The first limiting groove 313 is defined in the first pin 31 at the right side of the insertion hole 11 and away from the insertion hole 11, and the first limiting groove 313 is configured as the notch in the first pin 31 to accommodate the first limiting protrusion 211 fitted with the first limiting groove 313 and provided in the first supporting passage for this first pins 31. In such a case, the cross section of the first limiting groove 313 and that of the first limiting protrusion 211 are substantially shaped to be rectangular.

As illustrated in FIGS. 4 and 10, a left side wall and a right side wall of the support bracket 2 and the inner sidewall of the mounting cavity 12 define two second supporting passages 22, and two second pins 32 are located in the two second supporting passages 22 respectively. Each of two sidewalls of the support bracket 2 is provided with one second limiting protrusion 221, each of the two second pins 32 is provided with one second limiting groove 322, and the second limiting groove 322 is fitted with the second limiting protrusion 221. In the direction towards the exterior of the insertion hole 11, the front end face of the second limiting protrusion 221 is inclined rearwards, such that the second limiting groove 322 can be fitted with the second limiting protrusion 221 conveniently. When assembled, the second pins 32 can be first snapped onto the support bracket 2, and then the second pins 32 and the support bracket 2 are assembled into the mounting cavity 12 together.

As illustrated in FIGS. 1, 2, 3 and 5, the housing 1 includes the fixed baffle 13. The fixed baffle 13 is located at a rear end of the housing 1 and provided with clearance notches 131. The tail portions of the pins 3 passes through the clearance notches 131. In order to prevent the pins 3 from loosening during the insertion and removal of the earphone plug 200, the rear end face of the housing 1 is filled with the waterproof glue to fix the pins 3. Meanwhile, the waterproof glue can play the waterproof and dustproof role, so as to prevent the liquid (e.g. water) in the insertion hole 11 from flowing to the circuit board along the pin 3 through the insertion hole 11, thereby guaranteeing the operational reliability of the circuit board.

The fixed baffle 13 protrudes beyond the rear end face of the housing 1, and thus can prevent the waterproof glue from flowing to the circuit board, thereby further guaranteeing the operational reliability of the circuit board. In addition, since the fixed baffle 13 protrudes beyond the rear end face of the housing 1, when connecting segments 33 of the pin 3 are connected with the circuit board, the connecting segments 33 need to bypass the rear end face of the fixed baffle 13 to be connected with the circuit board. When the fixed baffle 13 is provided with the clearance notches 131, the connecting segments 33 pass through the clearance notches 131 to be connected with the circuit board, which can reduce the length of the pins 3 along the front-rear direction (e.g. the front-rear direction illustrated in FIG. 1), so as to further decrease the volume of the earphone socket 100. Meanwhile, the clearance notch 131 can position the pins 3.

Two sidewalls of each clearance notch 131 each are provided with the guide bevel 132, and the guide bevel 132 is inclined towards the direction away from the interior of the clearance notch 131 in the front-rear direction. Thus, when the pins 3 are mounted in the mounting cavity 12 from the rear end of the housing 1, the guide bevels 132 can guide the pins 3 to make the connecting segments 33 snapped into the clearance notches 131 smoothly.

As illustrated in FIGS. 2, 3, 4 and 10, the support bracket 2 includes a rear-end baffle 23, and the plurality of pins 3 can extend out of the mounting cavity 12 after passing through the rear-end baffle 23. The rear-end baffle 23 can prevent the support bracket 2 from coming out rearwards. Meanwhile, the glue can be filled in an accommodating chamber defined by the rear end face of the rear-end baffle 23 and the inner sidewall of the housing 1 together, so as to fix the pin 3 and play the waterproof and dustproof role at the same time. The end portion of at least one end of the rear-end baffle 23 is provided with the cutting recess 231. As illustrated in FIG. 3, end portions of left and right ends of the rear-end baffle 23 are separately provided with the cutting recess 231 extending along the up-down direction. The glue can be filled in the cutting recess 231 to reinforce the fixing the pins 3 and the waterproof and dustproof function under the action of the glue.

The earphone socket 100 further includes the shielding cover body. The shielding cover body shields the rear end of the mounting cavity 12. The adhesive layer is provided between the support bracket 2 and the shielding cover body, and provided between the housing 1 and the shielding cover body. The shielding cover body can further reinforce the waterproof and dustproof effect of the earphone socket 100 on the one hand, and protect the pins 3 extending out of the mounting cavity 12 from being damaged on the other hand. Meanwhile, the adhesive layer can enhance the waterproof and dustproof effect of the earphone socket 100.

The mobile terminal 1000 according to embodiments of the present disclosure will be described with reference to FIGS. 1 to 11.

The mobile terminal 1000 according to embodiments of the present disclosure includes the above earphone socket 100. By providing the above earphone socket 100, the tail portions of the plurality of pins 3 can be connected with the same circuit board, which can not only simplify the structure of the plurality of pins 3, but also simplify the structure of the earphone socket 100, thus reducing the volume of the earphone socket 100. Furthermore, the installation of the earphone socket 100 can be facilitated, and the layout of components in the mobile terminal 1000 can be optimized.

In some embodiments of the present disclosure, the mobile terminal 1000 can be a mobile phone, a tablet computer, a notebook computer and so on.

In the following, a method for manufacturing an earphone socket 100 according to embodiments of the present disclosure will be described with reference to FIGS. 1 to 11.

For the earphone socket 100 configured as the above earphone socket 100, the manufacturing method includes the following actions. A housing 1, a supporting bracket 2 and a plurality of pins 3 are provided. In S10, a first pin 31 of the plurality of pins 3 is snapped onto the support bracket 2 to constitute a support bracket assembly; and in S20, the support bracket assembly is inserted into the mounting cavity 12 of the housing from the rear end of the mounting cavity 12.

With the method according to embodiments of the present disclosure, the structure and the assembling process of the earphone socket 100 can be simplified, the assembling time can be saved, and the production efficiency can be improved.

In some embodiments of the present disclosure, the second pin 32 can also be snapped onto the support bracket 2 to constitute the support bracket assembly, and then the support bracket assembly assembled with the first pin 31 and the second pin 32 can be inserted into the mounting cavity 12 from the rear end of the mounting cavity 12.

In some embodiments of the present disclosure, the earphone socket 100 further includes the shielding cover body, and the shielding cover body shields the rear end of the mounting cavity 12. The method further includes an action S30 of providing a shielding cover body, providing an adhesive layer between the support bracket and the shielding cover body, and providing another adhesive layer between the housing and the shielding cover body. The shielding cover body can further reinforce the waterproof and dustproof effect of the earphone socket 100 on the one hand, and protect the pins 3 extending out of the mounting cavity 12 from being damaged on the other hand. Meanwhile, the adhesive layer can enhance the waterproof and dustproof effect of the earphone socket 100.

Reference throughout this specification to "an embodiment", "some embodiments", "an example", "a specific example" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics can be combined in any suitable manner in one or more embodiments or examples. Moreover, different embodiments or examples as well as the features in the different embodiments or examples described in the specification can be combined or united by those skilled in the related art in the absence of contradictory circumstances.

Although embodiments of the present disclosure have been shown and illustrated, it shall be understood by those skilled in the art that the above embodiments are explanatory and cannot be construed to limit the present disclosure, and changes, modifications, alternatives and variants can be made in the embodiments without departing from the scope of the present disclosure.

What is claimed is:

1. A mobile terminal, comprising:
    a display screen and an earphone socket, the display screen being spaced apart from the earphone socket, and the earphone socket comprising:
    a housing having an inner wall defining a mounting cavity, the inner wall comprising an inner sidewall and a back wall,
    a support bracket in the mounting cavity and including a supporting passage, and
    a plurality of pins, located between the support bracket and the inner sidewall;
    wherein the plurality of pins pass through the back wall to expose outer ends of the plurality of pins; and
    wherein at least one of the plurality of pins is snapped into the supporting passage.

2. The mobile terminal according to claim 1, wherein:
    the housing comprises a fixed baffle,
    the fixed baffle is located at a rear end of the housing and provided with clearance notches, and
    tail portions of the plurality of pins pass through the clearance notches.

3. The mobile terminal according to claim 2, wherein an open end of each clearance notch is provided with a guide bevel.

4. The mobile terminal according to claim 1, further comprising a circuit board, the plurality of pins have tail portions extending out from a common sidewall of the housing to be taken as connecting segments, the circuit board is provided with a plurality of bonding pads, and the connecting segments are welded to the bonding pads.

5. The mobile terminal according to claim 1, further comprising a shielding cover body configured to shield a rear end of the mounting cavity, an adhesive layer being provided between the support bracket and the shielding cover body and between the housing and the shielding cover body separately.

6. A mobile terminal, comprising a display screen and an earphone socket, the display screen being spaced apart from the earphone socket, and the earphone socket comprising:
    a housing, the housing having an inner wall defining a mounting cavity, the inner wall comprising an inner sidewall;
    a support bracket located in the mounting cavity and provided with a first supporting passage, and at least one first pin being snapped into the first supporting passage; and
    a plurality of second pins, located between the support bracket and the inner sidewall, wherein the inner wall further comprises a back wall and the plurality of second pins passes through the back wall to expose outer ends of the plurality of second pins, wherein one of the first supporting passage and the at least one first pin is provided with a first limiting protrusion, and the other of the first supporting passage and the at least one first pin is provided with a first limiting groove fitted with the first limiting protrusion.

7. The mobile terminal according to claim 6, wherein the at least one first pin is provided with the first limiting groove, and the first supporting passage is provided with the first limiting protrusion therein, the at least one first pin is provided with a flexed portion flexed to a side at a head portion, the flexed portion is provided with a protruding portion, and the first limiting groove is defined in a side of the protruding portion.

8. The mobile terminal according to claim 7, wherein the first limiting groove and the first limiting protrusion both have a substantially triangular cross section.

9. The mobile terminal according to claim 6, wherein the at least one first pin is provided with the first limiting groove, and the first supporting passage is provided with the first limiting protrusion therein, and the first limiting groove is configured as a notch.

10. The mobile terminal according to claim 9, wherein the first limiting groove and the first limiting protrusion both have a substantially rectangular cross section.

11. The mobile terminal according to claim 9, wherein the at least one first pin is provided with a bent portion at a tail portion thereof, the bent portion has a free end extending to a side again to form a connecting segment, and the connecting segment extends out of the mounting cavity through a rear end of the mounting cavity.

12. The mobile terminal according to claim 6, wherein the support bracket and an inner sidewall define a second supporting passage, and the plurality of second pins is snapped into the second supporting passage.

13. The mobile terminal according to claim 12, wherein one of the second supporting passage and the plurality of second pin is provided with a second limiting protrusion, and the other thereof is provided with a second limiting groove fitted with the second limiting protrusion.

14. The mobile terminal according to claim 13, wherein the support bracket has a sidewall provided with the second limiting protrusion, and the plurality of second pin is provided with the second limiting groove, an end face of the second limiting protrusion is inclined to one side.

15. The mobile terminal according to claim 6, wherein the housing comprises a fixed baffle; the fixed baffle is located at a rear end of the housing and provided with clearance notches; and the tail portions of the at least one first pin and the plurality of second pins pass through the clearance notches.

16. The mobile terminal according to claim 6, further comprising a circuit board, the at least one first pin and the plurality of second pins have tail portions extending out from a common sidewall of the housing to be taken as connecting segments, the circuit board is provided with a plurality of bonding pads, and the connecting segments are welded to the bonding pads.

17. The mobile terminal according to claim 6, further comprising a shielding cover body configured to shield the rear end of the mounting cavity, an adhesive layer being provided between the support bracket and the shielding cover body and between the housing and the shielding cover body separately.

18. A mobile terminal, comprising a display screen and an earphone socket, the display screen being spaced apart from the earphone socket, and the earphone socket comprising:
    a housing, the housing having an inner wall defining a mounting cavity, the inner wall comprising an inner sidewall;
    a support bracket located in the mounting cavity and comprising a rear-end baffle, the rear-end baffle having two end portions provided with the cutting recesses, and the cutting recesses being configured to be filled with glue; and
    a plurality of pins, located between the support bracket and the inner sidewall, wherein the inner wall further comprises a back wall and the plurality of pins passes through the back wall to expose outer ends of the plurality of pins.

19. The mobile terminal according to claim 18, wherein the housing comprises a fixed baffle; the fixed baffle is located at a rear end of the housing and provided with clearance notches; and the tail portions of the plurality of pins pass through the clearance notches.

20. The mobile terminal according to claim 18, further comprising a circuit board, the plurality of pins have tail portions extending out from a common sidewall of the housing to be taken as connecting segments, the circuit board is provided with a plurality of bonding pads, and the connecting segments are welded to the bonding pads.

* * * * *